United States Patent
Zelger

(10) Patent No.: US 12,313,161 B2
(45) Date of Patent: May 27, 2025

(54) MOUNTING ASSEMBLY FOR A COUPLER MECHANISM OF A MOTOR VEHICLE

(71) Applicant: Bayerische Motoren Werke Aktiengesellschaft, Munich (DE)

(72) Inventor: Klaus Zelger, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/839,817

(22) PCT Filed: Apr. 4, 2023

(86) PCT No.: PCT/EP2023/058813
§ 371 (c)(1),
(2) Date: Aug. 20, 2024

(87) PCT Pub. No.: WO2023/213485
PCT Pub. Date: Nov. 9, 2023

(65) Prior Publication Data
US 2025/0109792 A1    Apr. 3, 2025

(30) Foreign Application Priority Data
May 3, 2022    (DE) .................... 10 2022 110 808.2

(51) Int. Cl.
*F16H 63/34*    (2006.01)
*F16H 57/00*    (2012.01)

(52) U.S. Cl.
CPC . *F16H 63/3433* (2013.01); *F16H 2057/0056* (2013.01)

(58) Field of Classification Search
CPC .................... F16H 63/3433; F16H 2057/0056
See application file for complete search history.

(56) References Cited

U.S. PATENT DOCUMENTS

| 5,845,536 A * | 12/1998 | Certeza ................... F16H 59/04 |
| | | 74/473.26 |
| 2012/0132027 A1* | 5/2012 | Bruder ................... B60K 20/04 |
| | | 74/473.15 |

(Continued)

FOREIGN PATENT DOCUMENTS

| CN | 105697739 A | 6/2016 |
| CN | 107866444 A | 4/2018 |

(Continued)

OTHER PUBLICATIONS

International Search Report (PCT/ISA/210) issued in PCT Application No. PCT/EP2023/058813 dated Jun. 15, 2023 with English translation (5 pages).

(Continued)

*Primary Examiner* — Lori Wu
(74) *Attorney, Agent, or Firm* — Crowell & Moring LLP

(57) ABSTRACT

A mounting assembly for a coupler mechanism of a motor vehicle has at least a plurality of components which are to be mounted during mounting of the coupler mechanism as the latter is being assembled. A shifting element corresponds to one of the components which is configured to shift a clutch of the coupler mechanism. A first spring element corresponds to one of the components which is received displaceably on the shifting element and which is configured for at least indirect spring force-preloaded support on a housing of the coupler mechanism. The mounting assembly also has a mounting device which is separated from the components in the finally produced state of the coupler mechanism and has a securing element with a first securing element end and a second securing element end. The first securing element end is reversibly coupled releasably to the shifting element and, as a result, secures the first spring (Continued)

element against sliding off the shifting element during mounting.

10 Claims, 11 Drawing Sheets

(56) References Cited

U.S. PATENT DOCUMENTS

2018/0238447 A1* 8/2018 Lee .................... F16H 63/3433
2020/0096054 A1 3/2020 Smith et al.

FOREIGN PATENT DOCUMENTS

| DE | 11 2013 001 019 T5 | 1/2015 |
| DE | 10 2018 211 287 A1 | 1/2020 |
| DE | 11 2018 002 696 T5 | 2/2020 |
| EP | 2 392 840 A1 | 12/2011 |

OTHER PUBLICATIONS

German-language Written Opinion (PCT/ISA/237) issued in PCT Application No. PCT/EP2023/058813 dated Jun. 15, 2023 with English translation (10 pages).
German-language Office Action issued in German Application No. 10 2022 110 808.2 dated Dec. 21, 2022 (5 pages).

* cited by examiner

MOUNTING ASSEMBLY FOR A COUPLER MECHANISM OF A MOTOR VEHICLE

BACKGROUND AND SUMMARY

The invention relates to a mounting assembly for a coupler mechanism of a motor vehicle which at least comprises a plurality of components which are to be mounted during mounting of the coupler mechanism as the latter is being mounted, and a mounting device.

On the basis of such coupler mechanisms it is possible, for example, to interrupt a torque transmission between the electric drive machine and drive wheels of a motor vehicle as required (decoupling position), and for example to permit thereby a so-called coasting of the motor vehicle during the driving operation thereof, and to produce the torque transmission (coupling position) in order to permit a drive of the drive wheels by means of the drive machine.

Such a mounting assembly with a corresponding mounting device serves for simplifying the mounting of a plurality of components of the coupler mechanism during the mounting of the coupler mechanism.

It is the object of the present invention to provide a mounting assembly of the type mentioned in the introduction which permits a simplified mounting of the various components of a coupler mechanism during the mounting thereof.

The invention is based on a mounting assembly for a coupler mechanism of a motor vehicle, at least comprising a plurality of components which are to be mounted during mounting of the coupler mechanism as the latter is being mounted, of which components a shifting element corresponds to one of the components which is configured to shift a clutch of the coupler mechanism, at least one first spring element corresponds to one of the components which is received displaceably on the shifting element and which is configured for at least indirect spring force-preloaded support on a housing of the coupler mechanism, wherein the mounting assembly comprises a mounting device which is separated from the components in the finally produced state of the coupler mechanism and has a securing element with a first securing element end and a second securing element end, of which at least the first securing element end is reversibly coupled releasably to the shifting element and, as a result, secures the first spring element against sliding off the shifting element during mounting.

This is advantageous since, as a result, it is possible to mount simultaneously a plurality of components of the coupler mechanism, wherein the components can be captively held together by means of the mounting device and correctly installed in this state. Due to the reversible releasability, after the components have been installed as intended the mounting device can be non-destructively separated from the components without any residue and used for the mounting of any further coupler mechanisms. Resources can be saved thereby. The mounting device can also be denoted as a mounting tool.

The clutch can be shifted by means of the shifting element. Thus, for example, at least one clutch element of the clutch can be moved by means of the shifting element relative to a further clutch element of the clutch and the clutch shifted thereby. For example, the shifting element can be configured for shifting the coupler mechanism at least between a coupling position in which an electric drive machine of the motor vehicle is coupled in a torque-transmitting manner to a drive wheel of the motor vehicle, and a decoupling position in which the electric drive machine is decoupled from the drive wheel.

In an advantageous development of the invention, it is provided that the mounting assembly comprises a second spring element as one of the components which is coupled at least indirectly to an eccentric element as one of the components which is configured for displacing a parking lock element of a parking lock device of the motor vehicle between a parking lock position and an unlocking position. This is advantageous since, as a result, the second spring element can also be mounted by way of the mounting assembly and a common mounting of components with different functions can be carried out collectively with the mounting assembly. The mounting device can secure the second spring element, preferably secure the second spring element against sliding off the shifting element.

In a further advantageous development of the invention, it is provided that the first securing element end is reversibly inserted releasably into a first opening arranged on the shifting element and the second securing element end into a second opening arranged on the eccentric element. This is advantageous since a particularly large number of degrees of freedom of movement of the respective securing element end are restricted by the insertion of the respective securing element end into the respective opening, whereby an undesired release of the securing element from the components of the mounting assembly is impeded.

The first securing element end can preferably be inserted into the first opening positively, i.e. by forming a positive connection with the shifting element. The second securing element end can preferably be inserted into the second opening positively, i.e. by forming a positive connection with the eccentric element. The positive connection permits a low-effort and non-destructive (reversible) release of the corresponding securing element end from the shifting element or the eccentric element. Particularly preferably, the securing element can be in a resiliently deformed state when the first securing element end is inserted into the first opening and when the second securing element end is inserted into the second opening. As a result, a bracing of the securing element is achieved in a particularly reliable manner, whereby an undesired release of the securing element during mounting can be prevented.

In a further advantageous development of the invention, it is provided that the first opening and the second opening are of skewed orientation relative to one another. This can be understood to mean that a first opening center axis which is assigned to the first opening is of skewed orientation relative to a second opening center axis which is assigned to the second opening. Due to the skewed arrangement, a simple resilient bracing of the securing element can be implemented with the shifting element and the eccentric element. An undesired release of the securing element and thus the entire mounting assembly during mounting can be prevented by the bracing. Moreover, an undesired release of the mounting assembly from the components can be prevented in a simple manner by the skewed arrangement, since it can preferably be provided that the release can be implemented, for example, only by resilient deformation of the securing element.

In a further advantageous development of the invention, it is provided that, at least for the mounting of the components, the second spring element is secured by means of the second securing element end against sliding off the shifting element. This is advantageous since a plurality of components with different functions can be mounted thereby at the same time when the mounting assembly is brought, for example, onto the housing of the coupler mechanism. By securing the second spring element, it is possible to avoid having to hold this spring element manually during mounting, for example, which can be difficult in the case of a small amount of available installation space.

In a further advantageous development of the invention, it is provided that the first spring element and the second spring element, in the arrangement thereof on the shifting element, are held secured against respectively sliding off in the longitudinal direction of extent of the shifting element between the first securing element end and the second securing element end. This is advantageous since it is possible to achieve a particularly simple and effective securing of the spring elements against sliding off the shifting element due to the arrangement of the two spring elements between the securing element ends. Thus the first securing element end and the second securing element end can encompass together the first and second spring element at least in some regions. The shifting element can have between the two spring elements a thickening which can prevent the two spring elements from undesirably moving toward one another in the arrangement thereof on the shifting element. Thus, for example, in the axial direction of extent of the shifting element the following sequence can be present: first securing element end-first spring element-thickening-second spring element-second securing element end.

In a further advantageous development of the invention, it is provided that the mounting device comprises a first gear as one of the components and a securing element central region connecting the first securing element end and the second securing element end encompasses the first gear. A particularly simple releasable connection is achieved between the first gear and the further components by the encompassing, without bores or other fastening options having to be provided on the first gear. The first gear of the coupler mechanism can serve for at least indirect engagement with the drive machine. In other words, the first gear can be configured for the at least indirect torque-transmitting coupling to the drive machine. When the coupler mechanism is assembled, the first gear accordingly can be engaged with a gear on the drive machine side and coupled to a rotor shaft of the electric drive machine.

In a further advantageous development of the invention, it is provided that the securing element central region engages in a gear depression of the first gear. This enables a particularly space-saving, releasable connection of the first gear to the securing element or the mounting device. Thus for the releasable coupling between the first gear and the mounting device it is possible, by way of the mounting device or the securing element, to dispense with a circumferential encompassing of the first gear which requires installation space and which, for example, can impede bringing the first gear into engagement with further teeth. Preferably, the securing element central region can be braced in the gear depression, whereby an undesired release or slippage of the securing element central region from the first gear can be avoided in a particularly simple manner.

In a further advantageous development of the invention, it is provided that the securing element central region has a handle region which is configured for holding the mounting assembly during mounting. This advantageously facilitates the manual mounting of the components since by way of the handle region the entire mounting assembly can be used for manual mounting at a corresponding installation point. The handle region can preferably be braced in the gear depression. This enables a particularly secure fixing of the mounting assembly and the first gear to be implemented for the mounting.

In a further advantageous development of the invention, it is provided that the mounting device comprises at least one protective element which prevents contact of the securing element with the first gear during mounting and which is connected to the securing element. This serves for simple avoidance of contact, in particular metallic contact, between the first gear and the securing element. The protective element can preferably be formed from a plastic. This enables a particularly simple protection to be achieved against damage to the securing element and/or the first gear.

The features and combinations of features mentioned above in the description and the features and combinations of features mentioned hereinafter in the description of the figures and/or shown individually in the figures are not only able to be used in the respectively specified combination but also in other combinations or individually without departing from the scope of the invention.

Further advantages, features and details of the invention are found in the claims, the following description of preferred embodiments and with reference to the drawings.

Elements which are identical and functionally identical are provided hereinafter with the same reference signs.

DETAILED DESCRIPTION OF THE DRAWINGS

Figure 1:
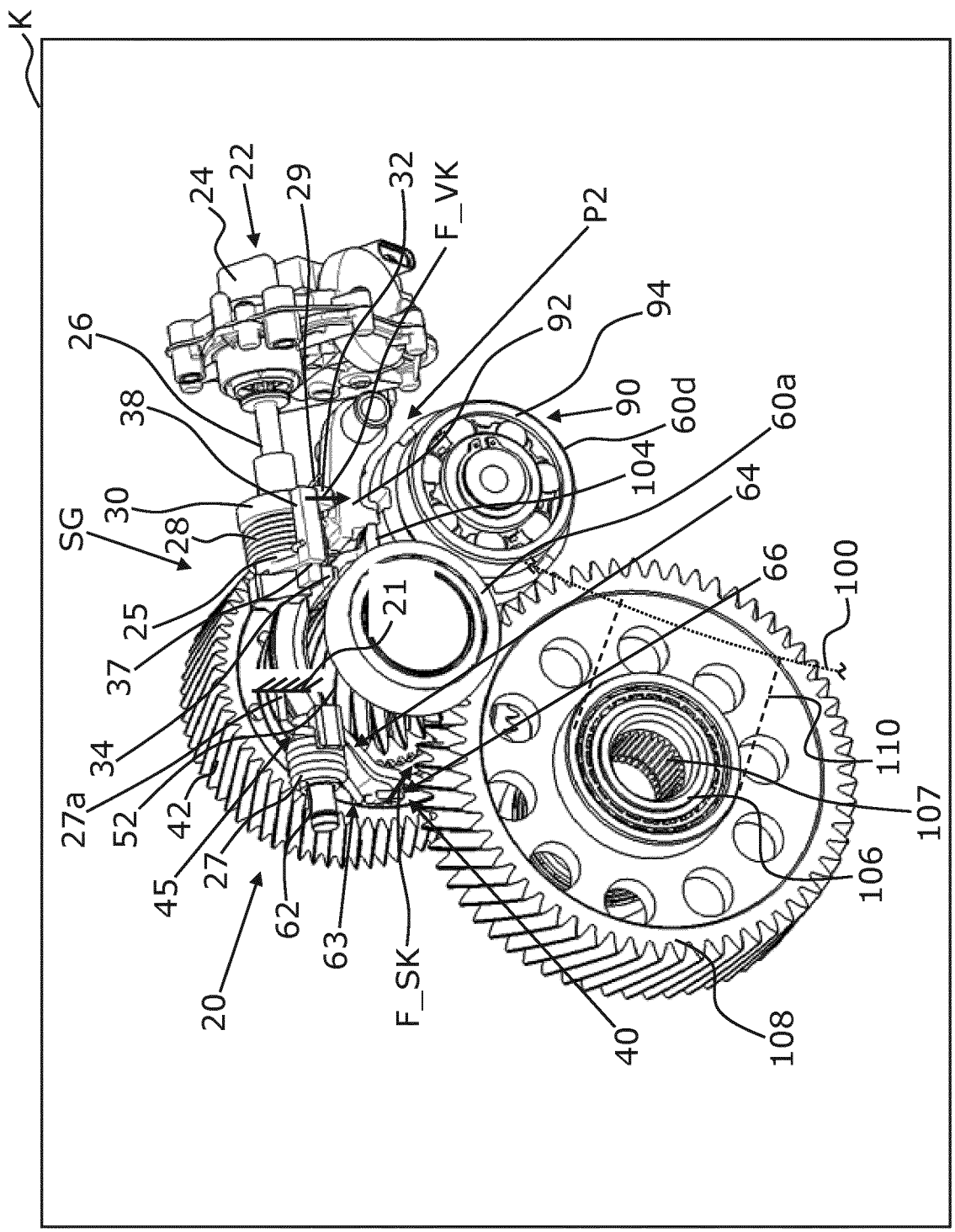
FIG. 1 is a schematic perspective view of a spur gear transmission which comprises a coupler mechanism and is coupled to an electric drive machine which serves for driving a drive wheel of a motor vehicle shown in highly abstracted form, wherein the motor vehicle comprises a parking lock device, a clutch for shifting the coupler mechanism and an actuating device.

FIG. 1 shows in a schematic perspective view a motor vehicle K which comprises electric drive machines, spur gear transmissions SG with coupler mechanisms 20 and drive wheels 100. In each case, one of the coupler mechanisms 20 is assigned to each of the spur gear transmissions SG. In other words, in each case one of the coupler mechanisms 20 is integrated in each case in one of the spur gear transmissions SG of the motor vehicle K.

Each of the drive machines 10 (see FIG. 2) is coupled in each case to one of the spur gear transmissions SG. Each of the spur gear transmissions SG can also be coupled in each case to one of the drive wheels 100 by the respective coupler mechanism 20 of the respective spur gear transmission SG being shifted from a decoupling position ES into a coupling position KS. The decoupling position ES and the coupling position KS can be identified by way of example with reference to FIG. 3. In the coupling position KS the respective drive wheel 100 is coupled in a torque-transmitting manner to the respective drive machine 10, whereas the torque transmission between the drive wheel 100 and the drive machine 10 is interrupted in the decoupling position ES. In other words, in the decoupling position ES of the respective coupler mechanism 20 the respective electric drive machine 10 is decoupled from the respective drive wheel 100. Overall this enables a selective driving of the respective drive wheels 100, thus a single wheel drive of each of the drive wheels 100. Thus each of the drive wheels 100 can be driven by the electric drive machine 10 assigned in each case thereto, in each case independently of the other drive wheels 100.

Figure 2:
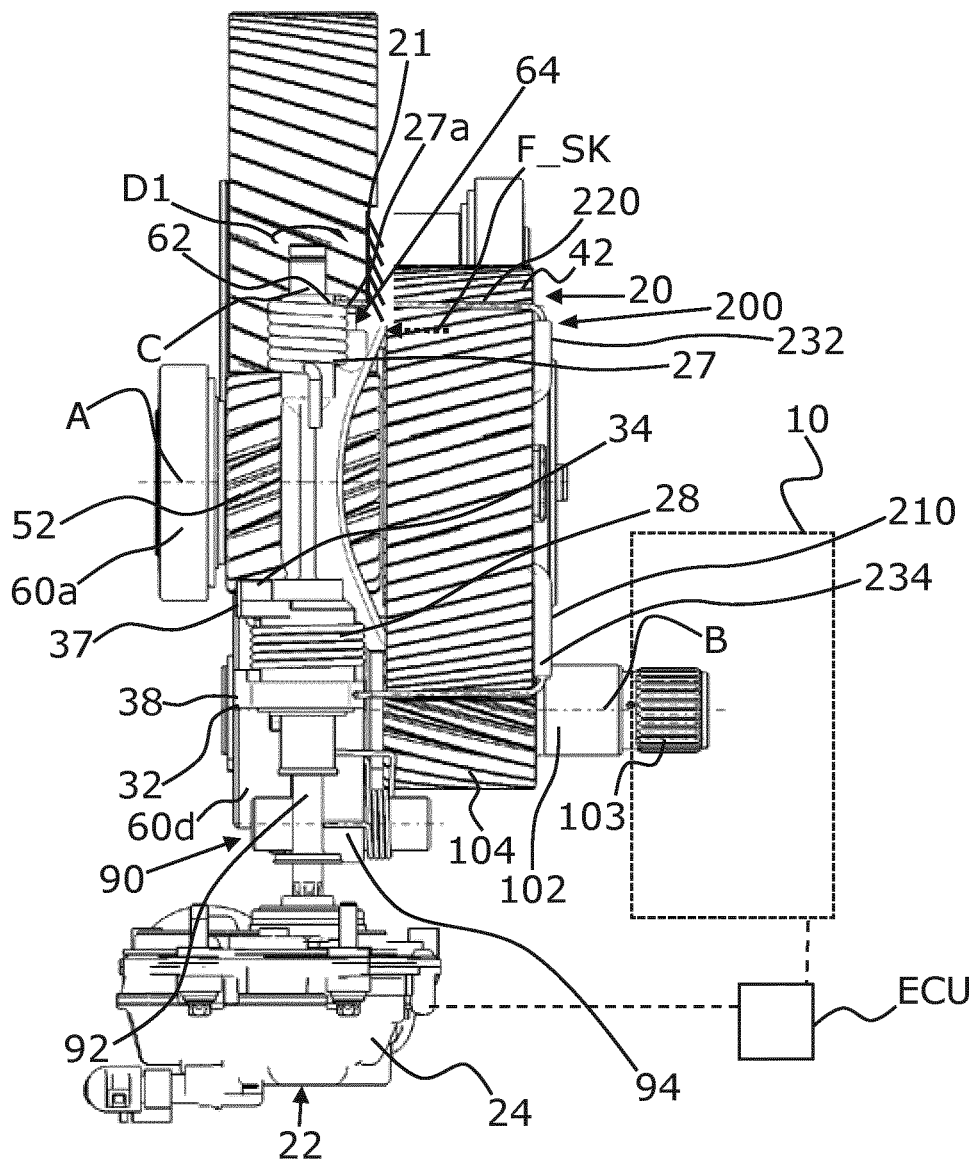
FIG. 2 is a plan view of the coupler mechanism, the electric drive machine, the parking lock device, the clutch and the actuating device.

For reasons of clarity only one of the spur gear transmissions SG with one of the coupler mechanisms 20 and only one of the drive wheels 100 are shown in FIG. 1. The following embodiments of the drive machine 10, the spur gear transmission SG, the coupler mechanism 20, and the drive wheel 100, however, apply to all of the drive machines 10, spur gear transmissions SG, coupler mechanisms 20 and drive wheels 100 of the motor vehicle K. The drive machine is concealed in FIG. 1 and thus cannot be identified but in FIG. 2 it is shown schematically. FIG. 2 also shows in plan view the coupler mechanism 20 and therewith a partial region of the spur gear transmission SG.

The spur gear transmission SG comprises a first transmission shaft 102 as can be identified in the plan view of FIG. 2. The transmission shaft 102 is coupled in a torque-transmitting manner to the electric drive machine 10 of the motor vehicle K. The coupling between the first transmission shaft 102 and the drive machine 10 which is torque-transmitting and thus is fixed in terms of rotation takes place merely by way of example via a splined shaft end portion 103, i.e. in other words an end portion of the first transmission shaft 102 which has a splined toothing. Via this splined toothing, the first transmission shaft 102 is engaged with the electric drive machine 10. A first transmission gear 104 is also coupled fixedly in terms of rotation to the first transmission shaft 102. The first transmission gear 104 is engaged with a first gear 42 of the coupler mechanism 20. The first gear 42 of the coupler mechanism 20 is in indirect engagement with the drive machine 10, i.e. is coupled indirectly to the drive machine 10.

The spur gear transmission SG also comprises a second transmission shaft 106 which is coupled in a torque-transmitting manner to the drive wheel 100. The first transmission shaft 102 and the second transmission shaft 106 can be coupled to one another in a torque-transmitting manner by means of the coupler mechanism 20 by setting the coupling position KS. The coupling of the second transmission shaft 106 to the drive wheel 100, which is shown only in some portions and highly abstracted, for reasons of clarity is only shown in FIG. 1. The first transmission shaft 104 serves for torque transmission on the drive side and the second transmission shaft 106 serves for torque transmission on the output side. The coupling which is torque-transmitting and thus fixed in terms of rotation between the second transmission shaft 106, which is shown in FIG. 1 only as a shaft stub, and the drive wheel 100 takes place only by way of example via an internal toothing 107 of the second transmission shaft 106, but which cannot be explicitly identified in FIG. 1. The drive wheel 100 is in engagement with the internal toothing 107 via a drive axle 110, shown in dashed lines in FIG. 1, and coupled fixedly in terms of rotation thereby to the second transmission shaft 106 of the spur gear transmission SG. With reference to FIG. 1 it can also be identified that the coupler mechanism 20 is provided for torque-transmitting coupling with exactly one side of the drive axle 110 of the motor vehicle K, whereby a single wheel drive of the drive wheel 100 can be implemented. The transmission of the torque between the electric drive machine 10 and the drive wheel 100 can take place without the interposition of a differential gear unit. The transmission of the torque between the electric drive machine 10 and the drive wheel 100 can thus take place without a differential gear unit (without a differential gear mechanism).

A second transmission gear 108 of the spur gear transmission SG is also coupled fixedly in terms of rotation to the second transmission shaft 106. The second transmission gear 108 is engaged with a second gear 52 of the coupler mechanism 20. Thus the second gear 52 of the coupler mechanism 20 is coupled fixedly in terms of rotation at least indirectly to the drive wheel 100.

For reasons of clarity, the respective gear teeth, for example of the (first and second) transmission gears 104, 108 and the (first and second) gears 42, 52 are not shown in FIG. 1.

Figure 5:
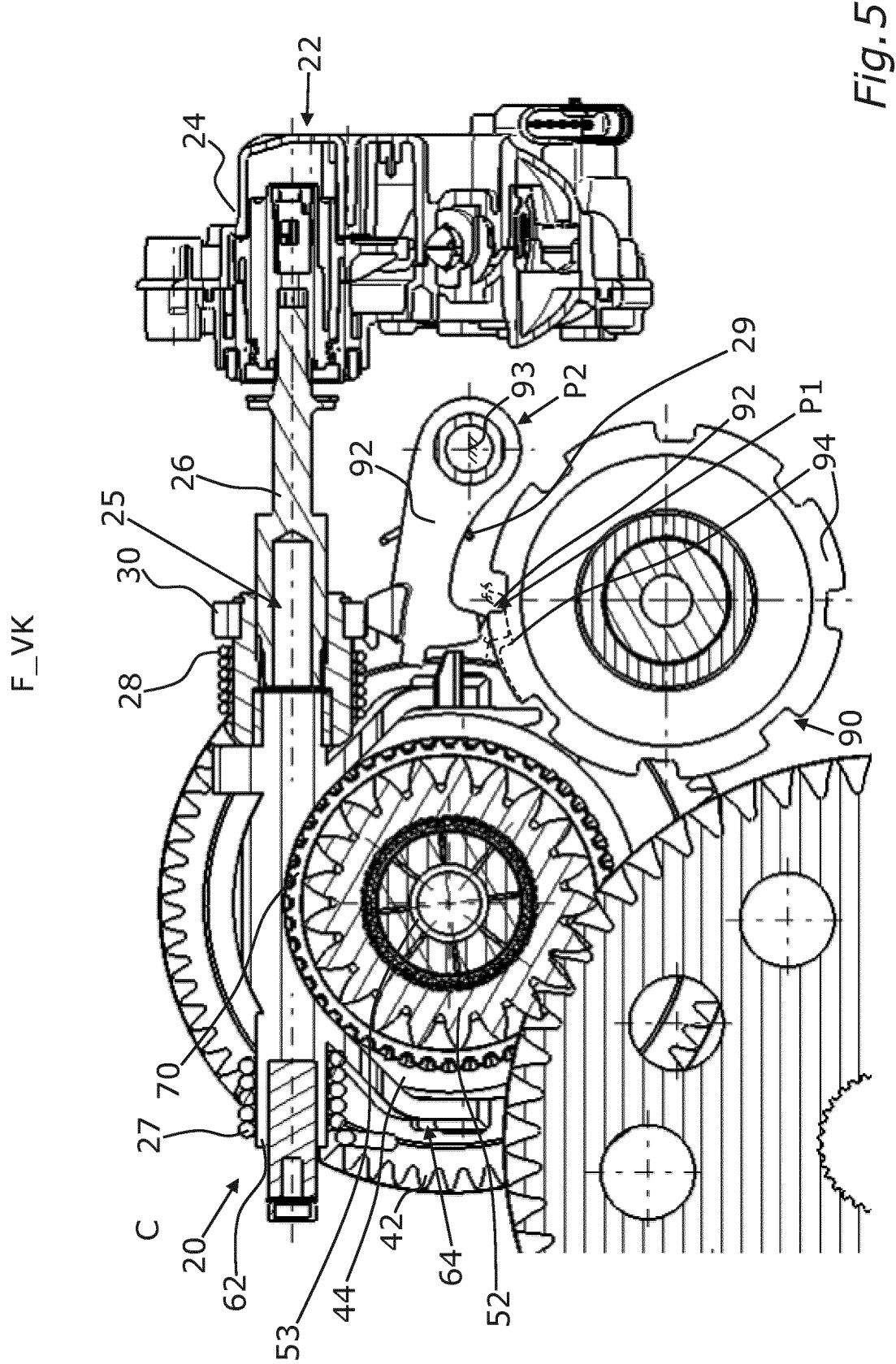
FIG. 5 is a further sectional view according to a cutting plane C shown in FIG. 2.
Figure 6:
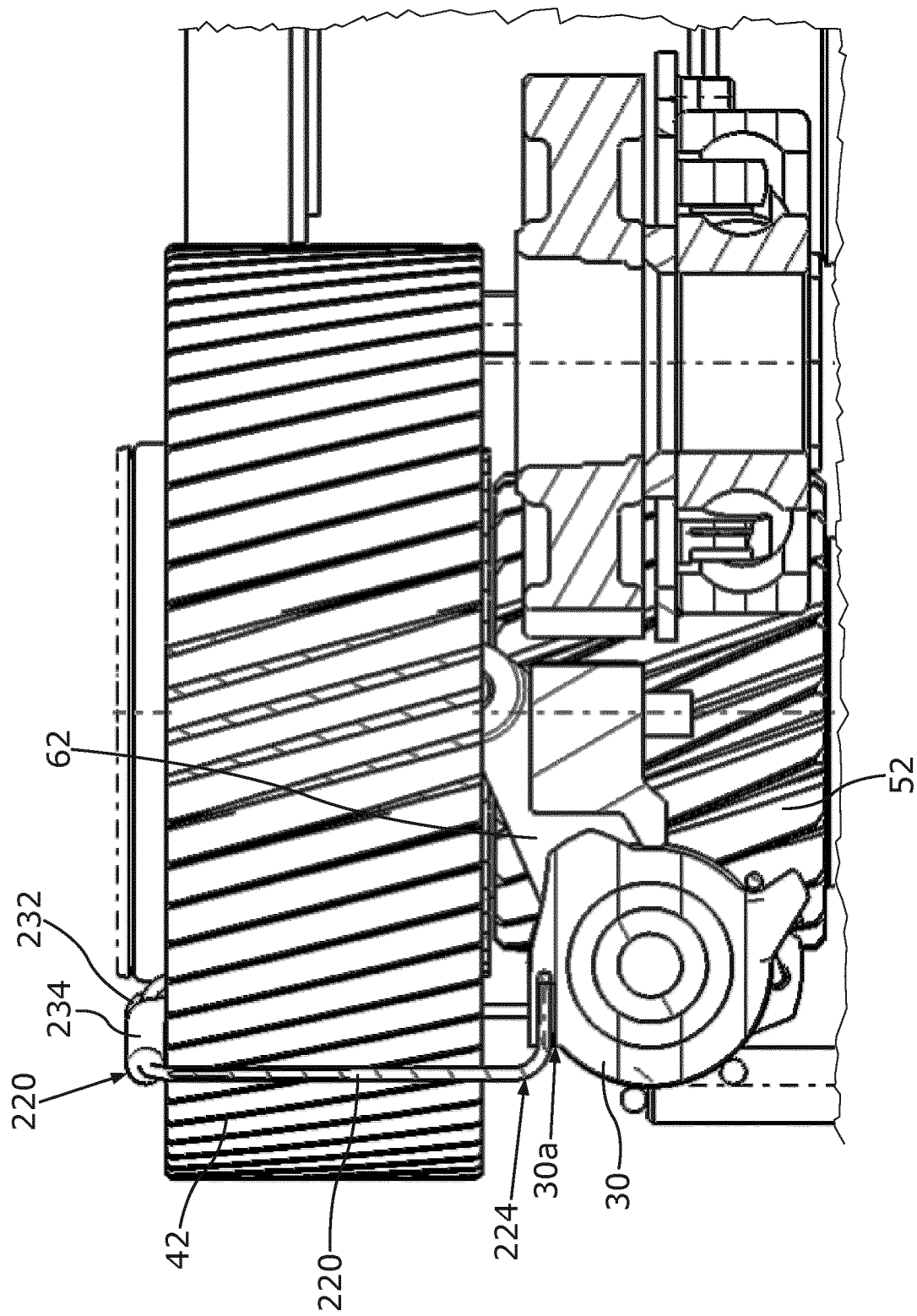
FIG. 6 is a plan view of a partial region of the coupler mechanism, which shows at least partially a mounting assembly for the coupler mechanism with a plurality of components to be mounted when assembling the coupler mechanism during the mounting thereof and with a mounting assembly.
Figure 7:
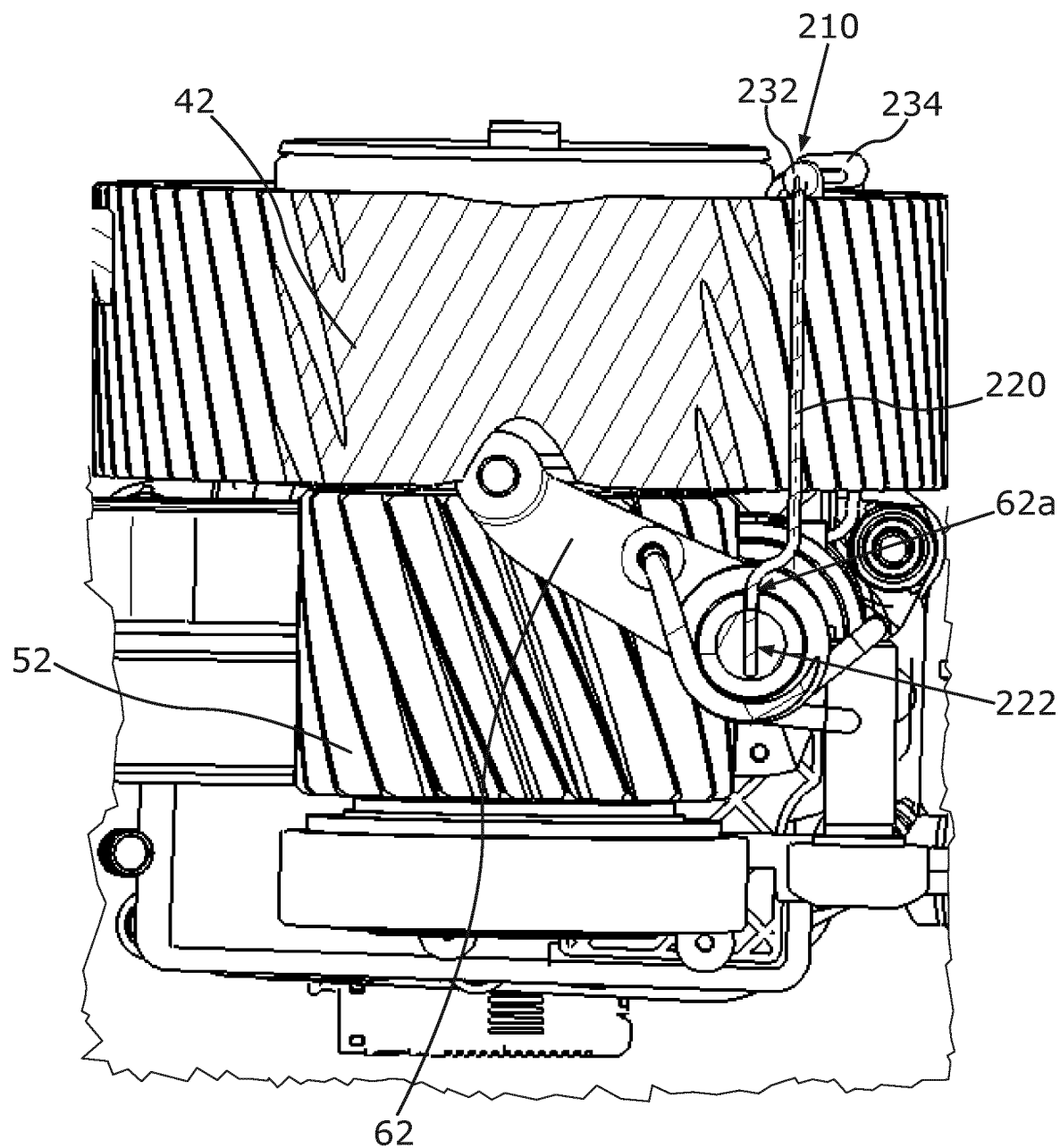
FIG. 7 is a side view of a partial region shown in section in the longitudinal direction of extent of a shifting element as one of the components, wherein a securing element end of a securing element of the mounting device is reversibly inserted releasably into a first opening arranged on the shifting element.

The motor vehicle K also comprises a parking lock device 90 which comprises a parking lock element 92. The parking lock element 92 in the present case is configured as a locking pawl. The parking lock element 92 can be displaced between a parking lock position P1 in which the parking lock element 92 is engaged with a parking lock wheel 94 of the parking lock device 90, and thereby blocks a rotation of the drive wheel 100, and an unlocking position P2 as can be identified with reference to FIG. 5. In FIG. 5 the parking lock position P1 is illustrated schematically by the representation in dashed lines of partial regions of the parking lock wheel 94 and the parking lock element 92. In the unlocking position P2, which can be identified for example in FIG. 1, the parking lock element 92 is not engaged with the parking lock wheel 94, whereby the rotation of the drive wheel 100 is released, i.e. not blocked by the parking lock device 90. With reference to FIG. 2, for example, it can be identified that the parking lock wheel 94 is coupled fixedly in terms of rotation to the first transmission shaft 102 and to the first transmission gear 104 and the electric drive machine 10. As can be seen with reference to FIG. 5, the parking lock element 92 can be rotatably mounted via a parking lock element bearing 93 on a housing, not shown further in the present case, for example the housing of the spur gear transmission SG, and can be displaced between the parking lock position P1 and the unlocking position P2 by a pivoting movement of the parking lock element 92 about the parking lock element bearing 93.

Figure 3:
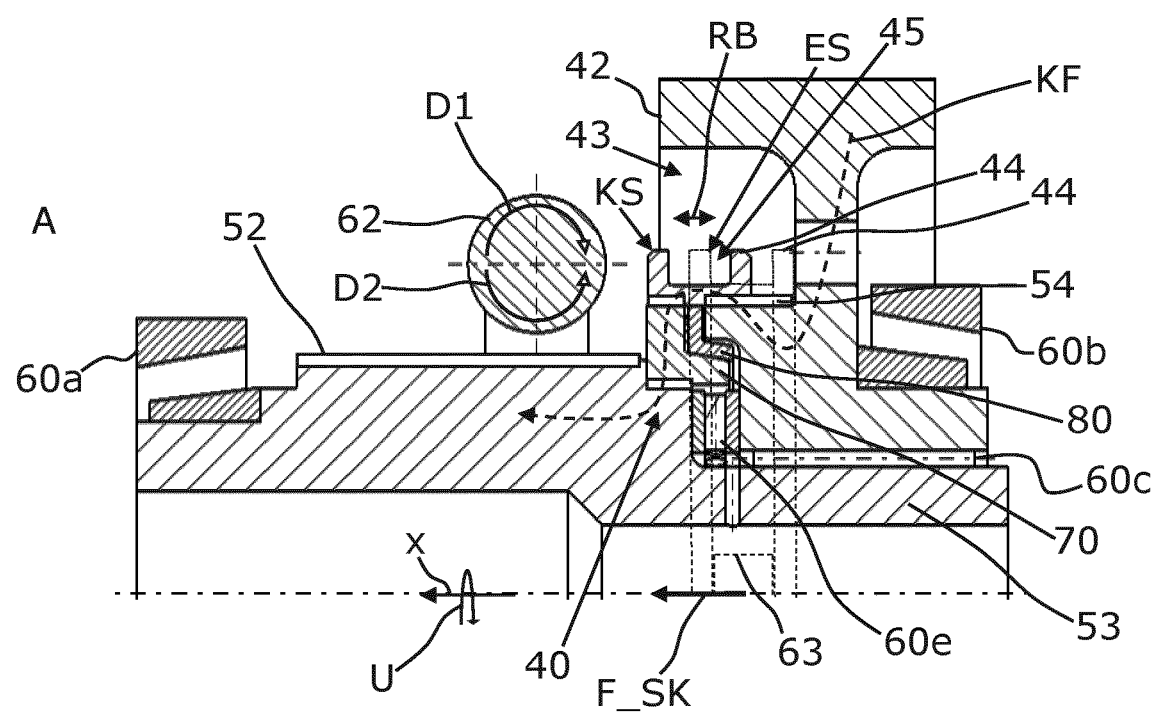
FIG. 3 is a sectional view according to a cutting plane A shown in FIG. 2.
Figure 4:
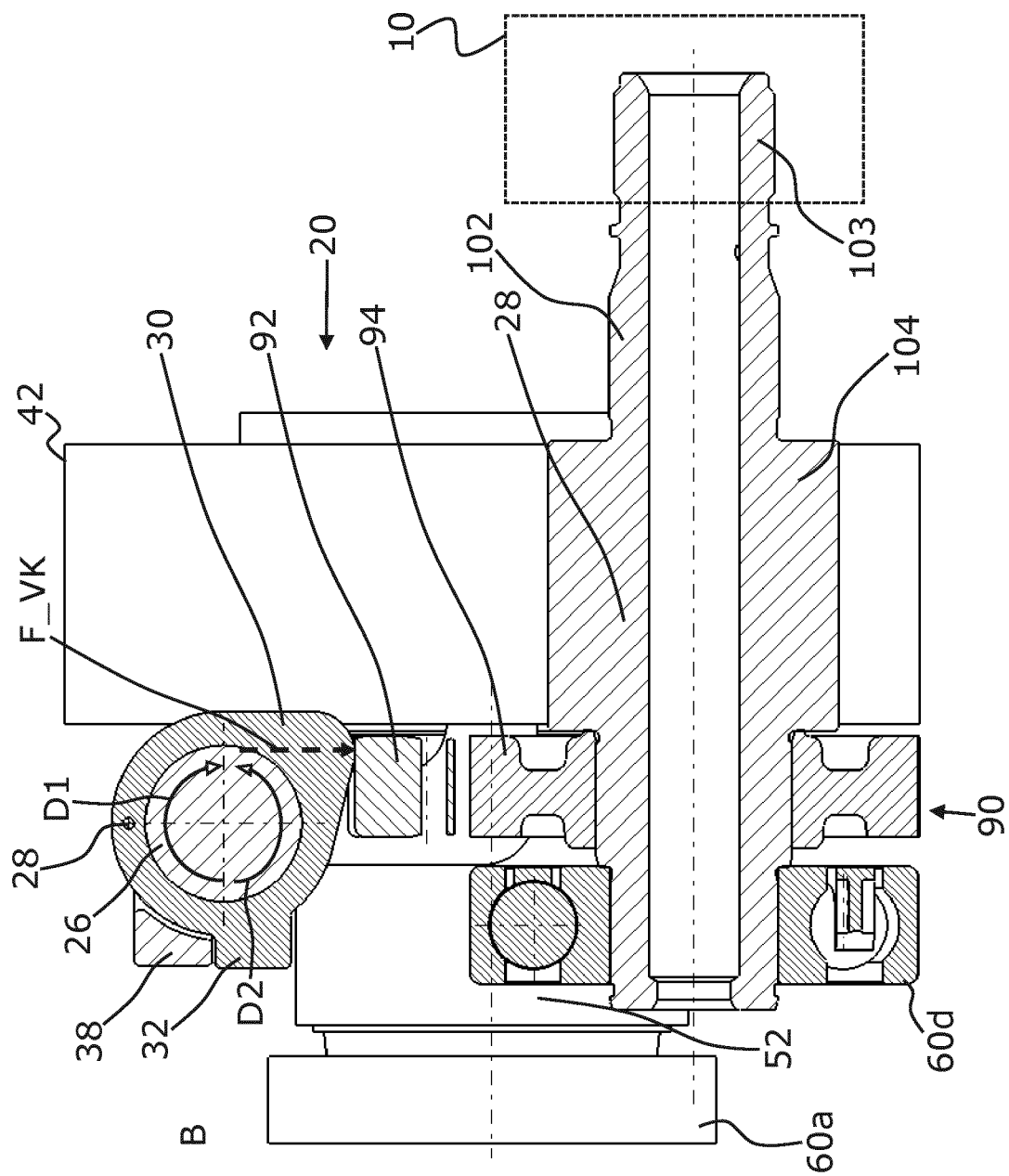
FIG. 4 is a further sectional view according to a cutting plane B shown in FIG. 2.

A plurality of rolling bearings 60a, 60b can be used for the bearing of the coupler mechanism 20 in this housing, for example, as can be identified with reference to FIG. 3. It is clear, however, that further bearings can be provided. The rolling bearings 60a, 60b are configured in the present case as adjusted cylinder roller bearings, wherein the rolling bearing 60a serves for the rotatable bearing of the second gear 52 on the housing and the rolling bearing 60b serves for the rotatable bearing of the first gear 42 on the housing. The first gear 42 is rotatably mounted and supported on a shaft 53 of the second gear 52 via a further rolling bearing 60c (see FIG. 3) which is configured in the present case as a needle bearing. The two gears 42, 52 are also supported against one another by a further rolling bearing 60e, namely an axial needle bearing in the axial direction of extent, and thus in the direction of an axis of rotation x. In FIG. 4 it is shown that the first transmission shaft 102 and thus the first transmission gear 104 is supported on the housing (not shown further) via a further rolling bearing 60d which is configured in the present case by way of example as a ball bearing.

The motor vehicle K also comprises an actuating device 22 with an actuator 24. The actuator 24 is configured, on the one hand, for actuating a clutch 40 of the coupler mechanism 20 which has at least one shifting element 62 and which serves for shifting between the coupling position KS and the decoupling position ES. On the other hand, the actuator 24 serves for displacing the parking lock element 92 between the parking lock position P1 and the unlocking position P2. The shifting element 62 is configured, for example, as a shift rocker or as a shift fork, as can be identified with reference to FIG. 1.

The clutch 40 is configured in the present case as a positive clutch, namely as a claw clutch. The motor vehicle K comprises a control unit ECU, the actuating device 22 and the electric drive machine 10 being able to be controlled thereby, as shown schematically in FIG. 2.

The construction of the clutch 40 can be identified by observing FIG. 1 together with the sectional view in FIG. 3. The clutch 40 comprises a first clutch element 44 which is coupled fixedly in terms of rotation to the first gear 42 at least indirectly, namely by means of a second clutch element 54 of the clutch 40. The second clutch element 54 can be configured as a fixed sleeve which can be coupled fixedly in terms of rotation to the first gear 42. However, in the present case the second clutch element 54 is configured as a toothing which is arranged in a gear recess 43 of the first gear 42, is connected in one piece to the first gear 42 and is coupled thereby fixedly in terms of rotation to the first gear 42. The first clutch element 44 is coupled fixedly in terms of rotation to the first gear 42 by the second clutch element 54, but due to the toothing a relative axial displacement is possible between the first clutch element 44 and the second clutch element 54 parallel to the axis of rotation x about which the gears 42, 52 during the operation of the motor vehicle K, for example, can rotate in a circumferential direction U indicated by an arrow.

The clutch 40 also comprises a connecting element 70 which, on the one hand, is coupled directly to the second gear 52 and, on the other hand, can be coupled fixedly in terms of rotation directly to the first clutch element 44, by the first clutch element 44 being shifted from the decoupling position ES into the coupling position KS. The connecting element 70 in the present case is engaged via respective splines, not denoted further, on the one hand, to the first clutch element 44 and, on the other hand, to the second gear 52. The connecting element 70 can be configured, in particular, as a fixed sleeve as can be identified with reference to FIG. 3. For setting the coupling position KS, the first clutch element 44 is brought into engagement with the connecting element 70, as shown in FIG. 3.

When there is a speed difference between the first gear 42 and the second gear 52, the clutch 40 comprises a locking element 80 for preventing the shifting from the decoupling position ES into the coupling position KS. The locking element 80 serves for releasing a relative movement RB, causing the shifting from the decoupling position ES into the coupling position KS, between the first clutch element 44 and the second clutch element 54 when there is equal speed between the first gear 42 and the second gear 52. When there is equal speed, therefore, the locking element 80 permits the movement of the first clutch element 44 and thus the shifting over from the decoupling position ES into the coupling position KS, wherein in the coupling position KS the flux of force KF can be guided via the first gear 42, the second clutch element 54, the first clutch element 44, the connecting element 70 and the second gear 52.

When there is equal speed between the first gear 42 and the second gear 52, produced by way of the electric drive machine 10, the locking element 80 releases the relative movement RB between the first clutch element 44 and the second clutch element 54, bringing about the shifting from the decoupling position ES into the coupling position KS.

In FIG. 3 the respective position of the first clutch element 44 is shown for illustration both in the coupling position KS and in the decoupling position ES (in dashed lines). Here it is advantageous if the first clutch element 44 and the connecting element 70 are arranged at least partially, preferably entirely, in the gear recess 43 in addition to the second clutch element 54 and the locking element 80 which are arranged in each case entirely in the gear recess 43. The flux of force KF between the first gear 42 and the second gear 52 is produced in a particularly small installation space and thus extends over a particularly short distance when the first clutch element 44 is arranged in the gear recess 43, not only in the decoupling position ES but also in the coupling position KS.

The shifting element 62 serves for setting the coupling position KS and the decoupling position ES. The shifting element 62 comprises a first element arm portion 64 and a second element arm portion 66 directly connected to the first element arm portion 64 and enclosing an angle with the first element arm portion 64. The first element arm portion 64 and the second element arm portion 66 form together an L-shape by which a particularly space-saving and trouble-free shifting is made possible. When observing FIG. 1 together with FIG. 3 it can be identified that the shifting element 62 is rotatably coupled to the first clutch element 44 via the second element arm portion 66. The shifting element 62, in particular on the second element arm portion 66, can have an engagement element 63, for example a sliding block, or an engagement region which is inserted into an engagement groove 45 of the first clutch element 44 extending at least in some regions in the circumferential direction U. The engagement element 63 can be identified in FIG. 1 and is schematically shown in FIG. 3.

If the shifting element 62 is rotated by the actuator 24, the shifting element arm portions 64, 66 can be pivoted and thereby a displacement of the first clutch element 44 between the coupling position KS and the decoupling position ES can be brought about.

The actuating device 22 comprises an actuating element 26 which is adjustable by means of the actuator 24 and which is configured for exerting, on the one hand, a shifting force F_SK on the shifting element 62 for actuating the clutch 40 and, on the other hand, for exerting a displacing force F_VK for displacing the parking lock element 92 between the parking lock position P1 and the unlocking position P2. The actuating element 26 is shown, for example, in FIG. 1 and in sectional view in FIG. 5. The actuating element 26 preferably can be configured as a shaft. This shaft can be connected fixedly in terms of rotation to a rotor shaft of the actuator 24. Alternatively, the actuating element 26 can also be configured as a rotor shaft of the actuator 24.

With reference to FIG. 5 it can be identified that the shifting element 62 is inserted in an adapter shaft 25 and can be rotatably mounted therein. The actuating element 26 is also inserted in the adapter shaft 25. In contrast to the shifting element 62, in the present case the actuating element 26 is connected fixedly in terms of rotation to the adapter shaft 25. The adapter shaft 25, which is also denoted in FIG. 1 and FIG. 2, is designed in the present case as a hollow shaft as can also be identified in FIG. 5. The actuating element 26 is coupled directly in a force-transmitting manner to the shifting element 62 of the clutch 40 via a first spring element 27 of the actuating device 22, which is configured as a torsion spring and in the present case is mounted on the adapter shaft 25. Via the first spring element 27 the shifting element 62 is preloaded by spring force on a housing 21 of the coupler mechanism 20. Since in a second rotational direction D2 the actuating element 26 is coupled in a torque-transmitting manner to the shifting element 62, the actuating element 26 is also at least indirectly supported on the housing 21 preloaded by spring force, namely via the shifting element 62 and the first spring element 27. For reasons of clarity, the housing 21 of the coupler mechanism 20 is only shown in FIG. 1 and FIG. 2 and represented only in highly abstracted form and schematically. In FIG. 1 and FIG. 2 it is shown that a spring element region 27a of the first spring element 27, which is preferably configured as a spring leg, is supported on the housing 21.

It can also be identified in FIG. 5 that the actuating element 26 is directly coupled in a force-transmitting manner to an eccentric element 30 of the actuating device 30 via a second spring element 28 of the actuating device 22 which is also configured as a torsion spring, the parking lock element 92 being displaceable thereby between the parking lock position P1 and the unlocking position P2. The eccentric element 30 is configured in the present case as a cam as can be identified in FIG. 4. Alternatively, the eccentric element 30 could also be configured as an eccentrically mounted circular disk, but in the present case this is not shown further.

The actuating element 26 can generally be rotated in a rotational direction D1 by operating the actuator 24, whereby both the shifting force F_SK can be exerted via the first spring element 27 on the shifting element 62 and the displacing force F_VK can be exerted via the second spring element 28 on the eccentric element 30.

In FIG. 1 the actuating device 22 maintains a drive shifting state in which the coupling position KS is shifted and at the same time the parking lock element 92 is held displaced in the unlocking position P2. In the drive shifting state the driving of the motor vehicle K is ensured by coupling the electric drive machine 10 to the drive wheel 100 via the coupler mechanism 20, and at the same time the parking lock element 92 is open and thus is held in the unlocking position ES.

In a released state, which can also be shifted, the motor vehicle K can operate for example in a so-called coasting mode, i.e. a so-called coasting of the motor vehicle K can be permitted in which the motor vehicle K is moved without the respective electric drive machines 10 driving the respective drive wheels 100 and without the respective parking lock device 90 blocking the movement of the motor vehicle K, in particular the rolling of the respective drive wheels 100. In the release state, the decoupling position ES is shifted and at the same time the parking lock element 92 is held displaced in the unlocking position P2.

The parking lock element 92, which is rotatably mounted on the housing, is pushed by means of a third spring element 29 which is assigned, for example, to the actuating device 22 and which is configured as a torsion spring—as are the first spring element 27 and the second spring element 28—counter to the force of gravity against the eccentric element 30 and held there in the unlocking position P2.

In the released state, a stop 32 which is on the eccentric element side and which is configured as a projection, and can also be denoted as a stop assigned to the eccentric element 30, bears against an eccentric element stop 38. The eccentric element stop 38 which is assigned to the actuating element 28, as can be identified particularly clearly in FIG. 4 and in FIG. 2, is also configured as a projection in the present case. Moreover, in the released state, a stop 34 which is on the shifting element side and which is configured as a projection, and can also be denoted as a stop which is assigned to the shifting element 62, bears against a shifting element stop 37 of the actuating element 26. The shifting element stop 37 which is assigned to the actuating element 26 is also configured in the present case as a projection, as can be identified with reference to FIG. 1 and FIG. 2.

A movement, in particular a rotation, of the shifting element 62 relative to the actuating element 26 can be defined by means of the shifting element stop 37. A movement, in particular a rotation, of the eccentric element 30 which is rotatably mounted on the actuating element 26, can be defined relative to the actuating element 26 by means of the eccentric element stop 38.

By way of the actuating device 22 it is also possible to set the drive shifting state in which, as mentioned above, the coupling position KS is shifted and at the same time the parking lock element 92 is held displaced in the unlocking position P2. In the drive shifting state, therefore, the drive wheel 100 is coupled via the spur gear transmission SG and thus also the coupler mechanism 20 to the electric drive machine 10 and the parking lock device 90 is open so that the drive wheel 100 can be driven by the electric drive machine 10 without the parking lock device 90 blocking the driving of the drive wheel 100.

In order to set the drive shifting state, the actuating element 26 can be rotated by way of the actuator 24 corresponding to the rotational direction D1 (clockwise here) indicated by an arrow in FIG. 2 and FIG. 3. If equal speed does not prevail between the gears 42, 52, the locking element 80 prevents the shifting from the decoupling position ES into the coupling position KS and thus the corresponding relative movement RB of the first clutch element 44 by means of the shifting element 62.

The rotation of the actuating element 26 in the rotational direction D1 causes the first spring element 27, via which the shifting element 62 and the actuating element 26 are coupled together in a force-transmitting manner, to be preloaded. To this end, the actuator 24 exerts a torque, by which the first spring element 27 is mechanically preloaded and thereby the shifting force F_SK is stored in the first spring element 27 as long as the locking element 80 prevents the coupling of the first clutch element 44 to the connecting element 70 and thereby the setting of the coupling position KS. The first clutch element 44 is pushed by means of the first spring element 27 via the shifting element 62 and the engagement element 63 arranged in the engagement groove 45, so to speak, by way of the shifting force F_SK in the direction of the locking element 80. The locking element 80 prevents the coupling of the first clutch element 44 to the connecting element 70 as long as the speed difference prevails between the first gear 42 and the second gear 52. As soon as the electric drive machine 10 has compensated for the speed difference, and there is equal speed between the two gears 42, 52, the locking element 80 releases the coupling of the first clutch element 44 to the connecting element 70 and thus the setting of the coupling position KS. As a result, the first clutch element 44 is moved by the shifting force F_SK being exerted in the direction of the connecting element 70 and the first clutch element 44 is brought into engagement with the connecting element 70, whereby the coupling position KS is set. It is clear that, for example with an acceleration of the motor vehicle K from a standstill, equal speed can prevail even without intervention by the electric drive machine 10, so that accordingly an intervention by the electric drive machine 10 can be dispensed with since in this case there is no speed difference.

The rotation of the actuating element 26 in the rotational direction D1 also causes the second spring element 28, via which the eccentric element 30 and the actuating element 26 are coupled together in a force-transmitting manner, to be preloaded. The second spring element 28 can be mechanically preloaded by the torque exerted by way of the actuator 24, and the displacing force F_VK can be stored thereby in the second spring element 28 when the displacement of the parking lock element 92 from the unlocking position P2 into the parking lock position P1 is mechanically prevented. The displacement from the unlocking position P2 into the parking lock position P1 can be mechanically prevented, for example, when the parking lock element 92 and the parking lock wheel 94 are oriented toward one another, as shown in FIG. 1, i.e. when the parking lock element 92 cannot engage in the parking lock element 94. If a speed of the first transmission shaft 102 falls below a predetermined speed limit value, i.e. the speed of the first transmission shaft is sufficiently small, which can be the case for example with a driving speed of the motor vehicle K of less than 5 m/h, the parking lock element 92 (here the locking pawl) can be brought into engagement with the parking lock wheel 94, i.e. the parking lock element 92 can be displaced from the unlocking position P2 into the parking lock position PP1. To this end, the eccentric element 30 is rotated by the displacing force F_VK stored in the second spring element 28 in the (first) rotational direction D1 and pushes the parking lock element 92 into a position in which the parking lock element 92 is latched to the parking lock wheel 94 and thus the parking lock position P1 is set. In this case, both the coupling position KS is shifted and at the same time the parking lock element 92 held displaced in the parking lock position P1, so that a blocking shifting state is set. The motor vehicle K can then be kept at a standstill by way of the parking lock device 90.

During operation of the motor vehicle K it is generally possible by way of the actuating device 22 to hold the first spring element 27 by the shifting force F_SK, and also in particular at the same time the second spring element 28 by the displacing force F_VK, in each case in a preloaded state. As soon as equal speed prevails between the two gears 42, 52, i.e. the two gears 42, 52 in each case have the same speed (gear speed), the first clutch element 44 is moved and shifted from the decoupling position ES into the coupling position KS via the first spring element 27, in particular by the at least partial relaxation of the first spring element 27 and the pivoting of the element arm portions 64, 66 brought about thereby. As soon as the driving speed of the motor vehicle K is sufficiently low, the parking lock element 92 can be moved by means of the eccentric element 30 counter to a spring force of the third spring element 29 and moved from the unlocking position P2 into the parking lock position P1 via the second spring element 28, in particular by the at least partial relaxation of the second spring element 28.

In order to set the release state once again, by operating the actuator 24, the actuating element 26 can be rotated in the second rotational direction D2 opposing the first rotational direction D1. For setting the released state, starting from the drive shifting state and/or from the blocking shifting state, the shifting element stop 37 and the stop 34 on the shifting element side and/or eccentric element stop 38 and the stop 32 on the eccentric element side are particularly useful, since the respective stops 37, 34 or 38, 32 which correspond to one another permit a reliable resetting of the shifting element 62 and/or the eccentric element 30 and thus the reliable setting of the decoupling position ES and the unlocking position PS.

A significant advantage of the motor vehicle K is that due to the described arrangement it is possible to exclude an undesired shifting state in which the parking lock position P1 and at the same time the decoupling position ES is set. Thus the motor vehicle K has a particularly high level of functional reliability.

A significant advantage of the shifting element 62 which is preloaded by spring force on the housing 21 of the coupler mechanism 20 is that the shifting element 62 (here the shift rocker) in the decoupling position ES is already supported on the housing 21 via the first spring element 27 which is preloaded by spring force, preferably supported with maximum preloading. The first spring element 27, with the relaxation thereof, can assist the movement of the shifting element 62 and thus significantly accelerate the shifting from the decoupling position ES into the coupling position KS, whereby shifting is possible, in particular, with little delay and, in particular, a high shifting speed can be achieved. Due to the movement from the coupling position KS into the decoupling position ES, i.e. as a result of the rotation in the second rotational direction D2 by way of the actuator 24, not only the decoupling position ES and the locking position PS can be set but also the first spring element 27 can be braced by increasing the spring force preloading.

It is also contemplated that the actuator 24 exclusively releases the relaxation of the first spring element 27 so that the shifting from the decoupling position ES into the coupling position KS can take place exclusively by the first spring element 27, i.e. by the relaxation of the first spring element 27. As a result, the actuator 24 can be operated particularly gently, namely the actuator 24 does not have to bring about significant acceleration of the shifting element 62 for the movement thereof, but the acceleration can be implemented exclusively by the first spring element 27 which is preloaded on the housing 21. Due to the relaxation of the first spring element 27 which is preloaded on the housing 21, a particularly rapid shifting can also take place from the decoupling position ES into the coupling position KS, in particular even before the electric drive machine 10 has reached a desired target speed.

Figure 11:
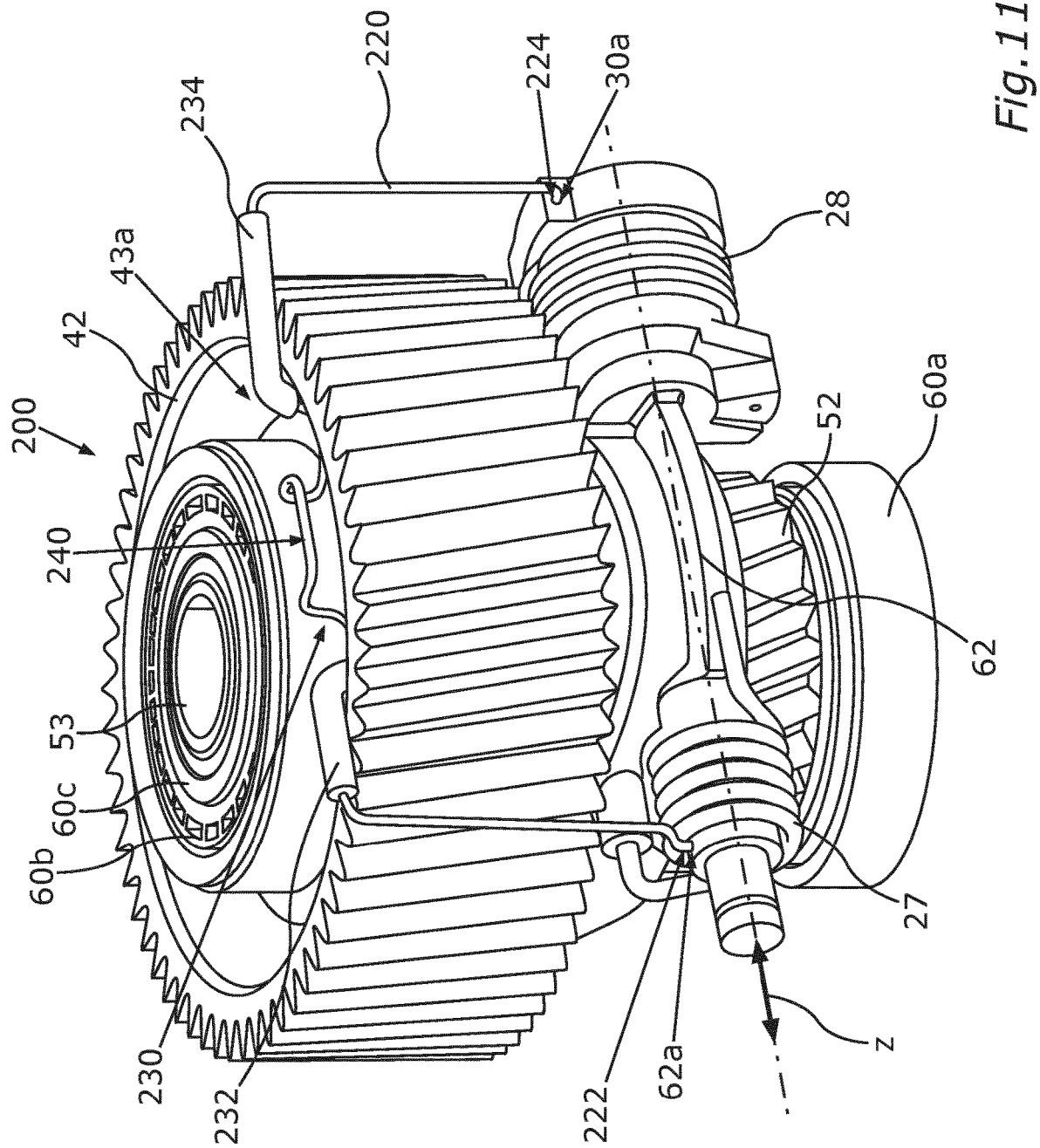
FIG. 11 is a further schematic perspective view of the mounting assembly, wherein the securing element when used as intended is resiliently deformed, whereby a first securing element end of the securing element is held secured in a first opening and a second securing element end is held secured in a second opening positively and additionally or alternatively non-positively.

FIG. 11 shows in a schematic perspective view a mounting assembly 200 for the coupler mechanism 20 of the motor vehicle K.

The mounting assembly 200 can comprise a plurality of components which are to be mounted during mounting of the coupler mechanism 20 as the latter is being mounted.

The mounting assembly 200 can preferably comprise all of the components shown in FIG. 11, such as for example the gears 42, 52 and the rolling bearings 60*a-c*, to mention just some of the components shown in FIG. 11.

The shifting element 62, which is configured for shifting the clutch 40 of the coupler mechanism 20 and which is configured as a shift rocker or as a shift fork, corresponds to one of the components. The first spring element 27 which is displaceably received on the shifting element 62 and which is configured for at least indirect spring force-preloaded support on the housing 21 of the coupler mechanism 20 corresponds to another of the components.

In order to create a particularly simple mounting of the components on the housing 21 and to prevent any errors in the mounting or the components undesirably falling apart, the mounting assembly 200 comprises a mounting device 210. In the finally produced state of the coupler mechanism 20, the mounting device 210 can be detached from the components and thus reversibly released. As a result, the mounting device 210 can be used again for mounting a different coupler mechanism, whereby resources are saved.

The mounting device 210, which generally can also be denoted as a mounting tool, comprises a securing element 220 which has a first securing element end 222 and a second securing element end 224. The securing element 220 is preferably formed from a wire and is particularly preferably designed as a so-called wire bracket. The design as a wire permits an elastic deformation of the securing element 220 by exerting force (deformation force). Moreover, the securing element 220 formed from wire takes up a particularly small amount of installation space. The wire can preferably be formed from spring steel.

Figure 8:
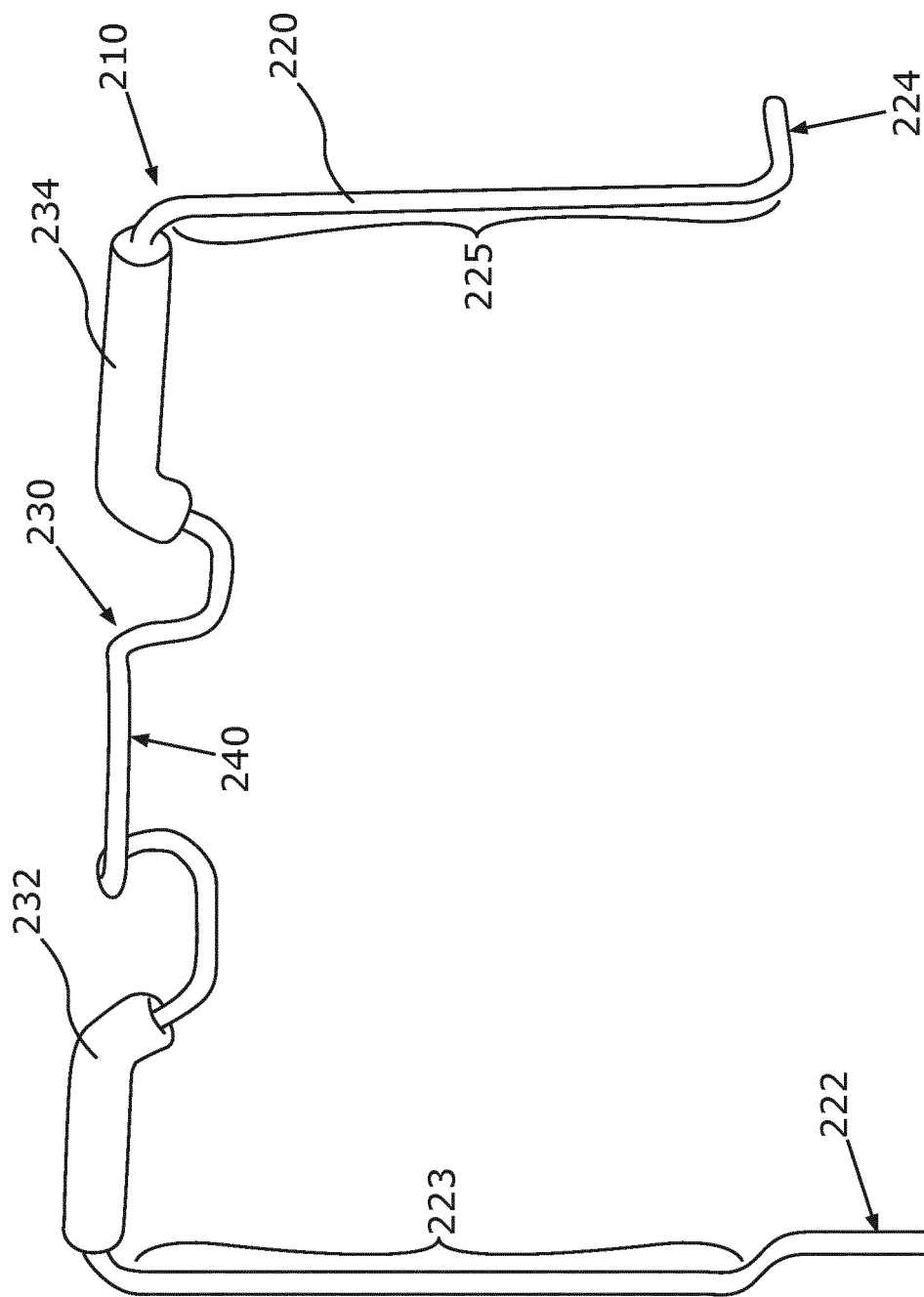
FIG. 8 is a schematic perspective view of the mounting device which has the securing element and protective elements connected to the securing element.
Figure 9:
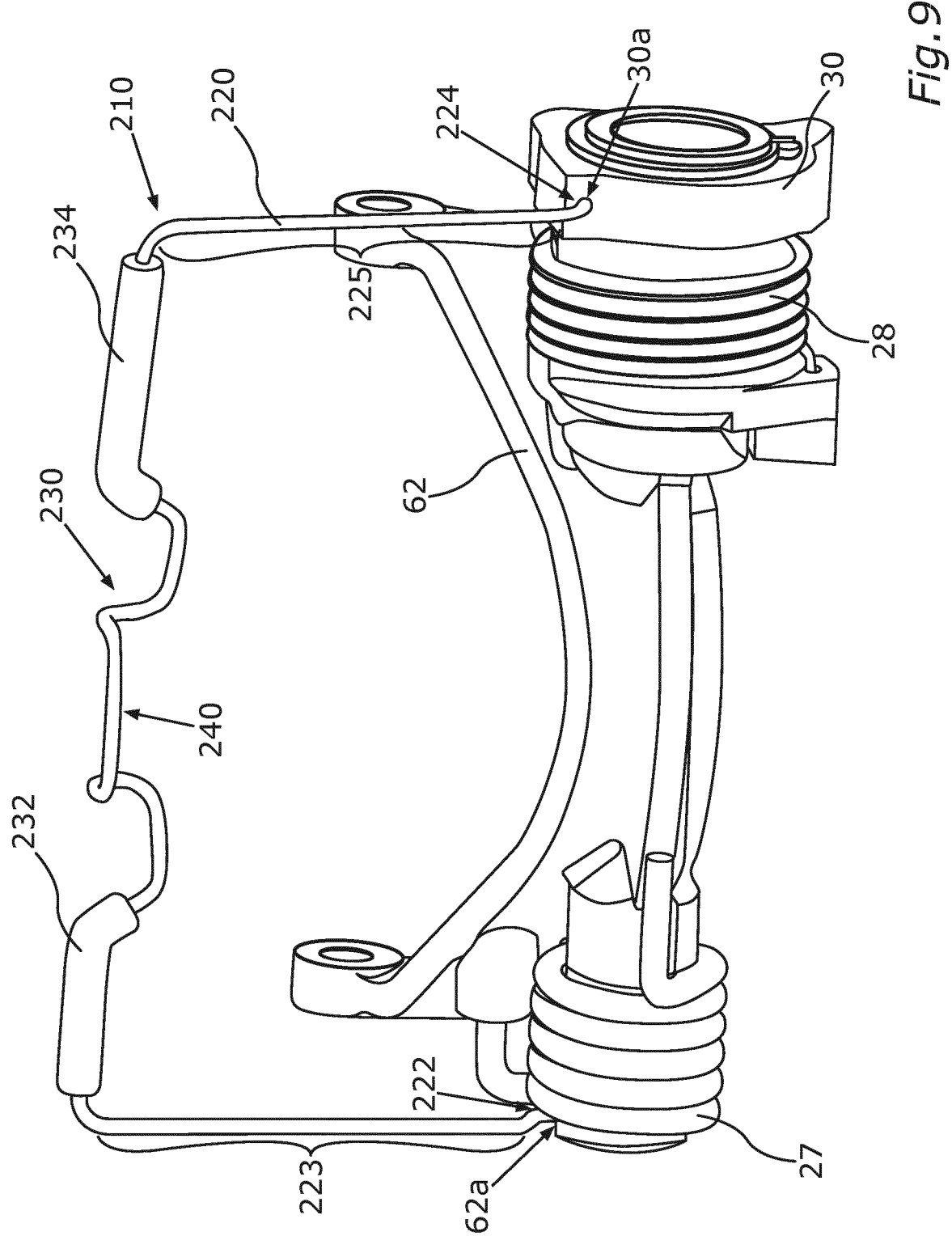
FIG. 9 is a further schematic perspective view which partially shows the mounting assembly and on the basis thereof it can be identified that respective securing element ends of the securing element are inserted into openings of skewed orientation to one another.

The securing element 220 can have a substantially U-shaped external contour which can be clearly identified in FIG. 8. This U-shaped external contour is produced from leg regions 223, 225 of the securing element 220 which are arranged at least substantially parallel to one another, namely a first leg region 223 and a second leg region 225. The first leg region 223 connects the first securing element end 222 to the securing element central region 230, whereas the second leg region 225 connects the securing element central region 230 to the second securing element end 224. The U-shaped external contour permits the use of a plurality of regions of the mounting device 210 or the securing element 220, such as for example the two securing element ends 222, 224 and the securing element central region 230 for the reversible releasable fixing of the different components during mounting thereof.

The stipulation according to which the leg regions 223, 225 are arranged substantially parallel to one another, is to be understood to mean that the first leg region 223 and the second leg region 225 enclose an angle of 20° or less between one another.

The first securing element end 222 is reversibly coupled releasably to the shifting element 62 and during the mounting the first spring element 27 is secured thereby against sliding off the shifting element 62.

The second spring element 28, as another of the components, is coupled at least indirectly to the eccentric element 30 which is configured for the displacement of the parking lock element 92 of the parking lock device 90 of the motor vehicle K between the parking lock position P1 and the unlocking position P2. The eccentric element 30 corresponds to a further component of the mounting assembly 200.

The mounting assembly 200 can preferably comprise the components shown in FIG. 11, wherein the components shown in FIG. 11 can be secured against dropping down and against falling apart during the mounting thereof by way of the mounting device 210, and can be brought onto the housing 21 by means of the mounting device 210. In particular, the components shown in FIG. 11, for example, can be suspended on the mounting device 210 or held on the mounting device 210 and thereby brought onto the housing 21 in a particularly captive and targeted manner and, for example, secured to the housing 21. To this end, the entire mounting assembly 200 can be moved by way of the mounting device 210 in the direction of the housing 21 and, for example, the rolling bearing 60*a* of the components can be secured to the housing 21.

During mounting, the first securing element end 222 is reversibly inserted releasably into a first opening 62*a* which is arranged on the shifting element 62 and the second securing element end 224 into a second opening 30*a* which is arranged on the eccentric element 30.

The first opening 62*a* and the second opening 30*a* in the present case are of skewed orientation relative to one another.

For mounting the components, the second spring element 28 is secured by means of the second securing element end 224 against sliding off the shifting element 62.

The first spring element 27 and the second spring element 28, during mounting in the arrangement thereof on the shifting element 62, are generally held securely between the first securing element end 222 and the second securing element end 224 against respectively sliding off the shifting element 62 in a longitudinal direction of extent z, shown by a double arrow in FIG. 11. The longitudinal direction of extent z runs along an axis of rotation about which the shifting element 62 can be moved according to the rotational directions D1, D2.

Figure 10:
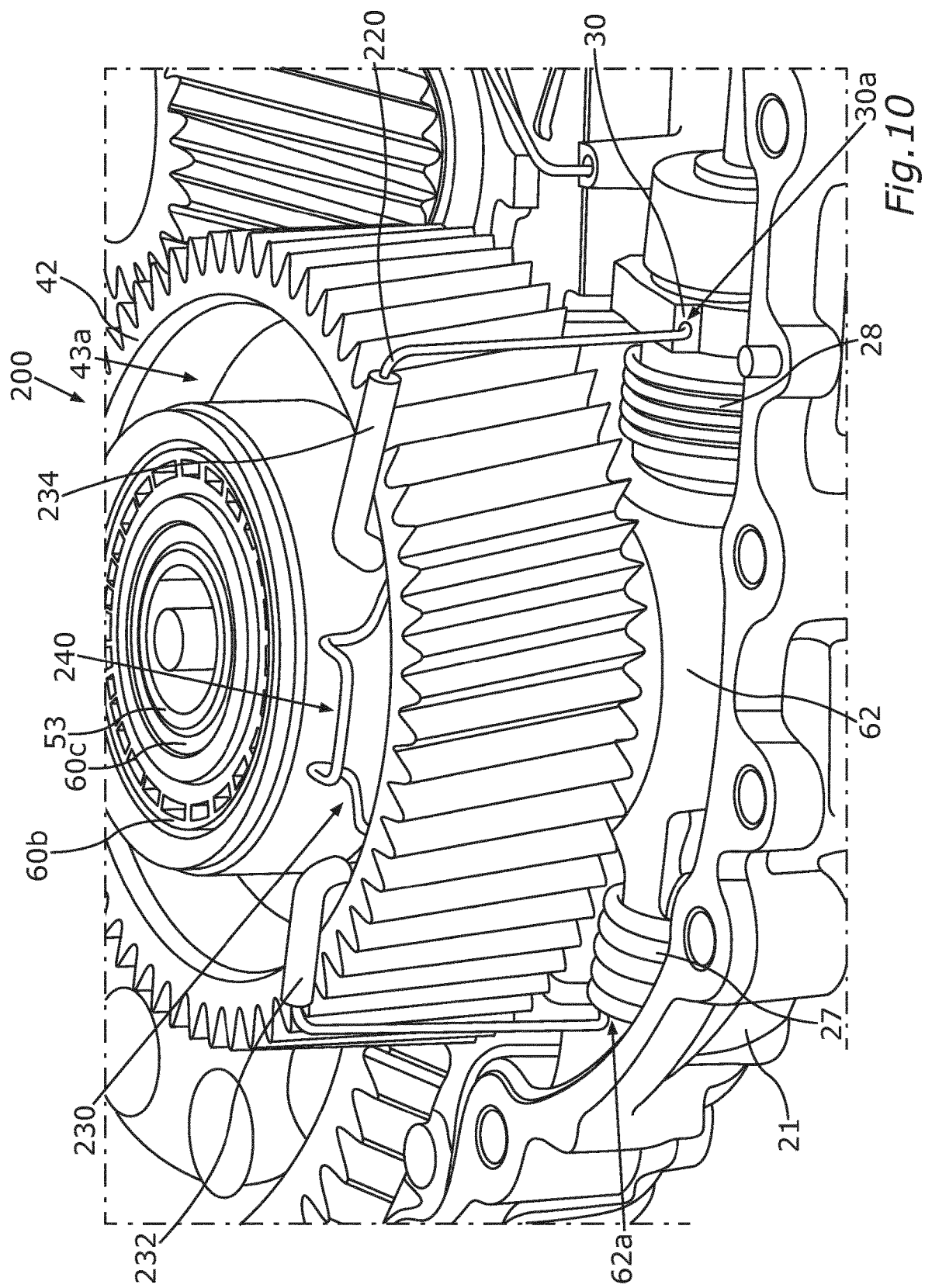
FIG. 10 is a further schematic perspective view of the mounting assembly which shows the arrangement of the components on a housing of the coupler mechanism.

The mounting device 200 comprises the first gear 42 as one of the components, wherein the securing element central region 230, connecting the first securing element end 222 and the second securing element end 224 at least indirectly via the leg regions 223, 225, encompasses the first gear 42, as can be identified with reference to FIG. 10 and FIG. 11.

The components can be held together in a particularly captive manner by the securing element central region 230 engaging in a gear depression 43*a* of the first gear 42. Particularly preferably, the securing element central region 230 is braced in the gear depression 43*a* by the first gear 42.

For simple manual mounting, the securing element central region 230 has a handle region 240 which is configured for holding the mounting assembly 200 during mounting, as can be identified particularly clearly with reference to FIG. 8, FIG. 9, FIG. 10 and FIG. 11. The handle region 240 can be used generally as a holding and dismantling handle.

In FIG. 6 to FIG. 11 it is also shown that the mounting device 210 comprises protective elements 232, 234 which prevent contact of the securing element 220 with the first gear 42 during mounting and which are connected to the securing element 220. While the securing element 220 generally can be formed from a wire, the protective elements 232, 234 can consist, for example, of a plastic or rubber, so that any damage caused by the mounting can be prevented. The protective elements 232, 234 can generally be formed by encapsulating the securing element 220 with plastic.

Even in the case of little available installation space, the mounting device 200 can be brought onto the housing 21, i.e. moved to the intended location on the coupler mechanism so that the respective components can be correctly installed in a simple manner. The release of the mounting device 210 from the components of the mounting assembly 200, for example after the correct positioning of the components, can take place by a force being exerted on the securing element 220 so that at least one of the two securing element ends 222, 224 is brought out of the respective opening 62a, 30a. Then the respective remaining securing element end 222, 224 can be threaded out or pulled out of the respective opening 62a, 30a. Thus, a resilient deformation of the mounting device 200, in particular of the securing element 220, can be brought about, for example, due to the exertion of the force by which the first securing element end 222 or the second securing element end 224 can be pulled out of the first opening 62a or second opening 30a. After pulling out the first securing element end 222 or the second securing element end 224, the exertion of the force can be terminated and the securing element 220 relaxed, i.e. a relaxed state of the securing element 220 can be set. In this relaxed state the second securing element end 224 or the first securing element end 222 can be pulled out of the second opening 30a or first opening 62a. Then the mounting device 210 can be removed from the components which are now positioned for the correct use thereof.

The mounting device 210 (mounting tool) prevents any falling apart of individual components which, after the mounting thereof, can form at least partially an actuating unit of the coupler mechanism 20.

The mounting device 210 can serve as a transport lock for the components so that the components can be transported without the mounting assembly 200 being at risk of falling apart.

The mounting device 210 serves as a mounting tool for inserting in the housing 21, in particular into a housing part of the housing 21 which is configured as a gear cover.

After the mounting, the mounting device 210 can be removed again, and in particular reused, so that the mounting device 210 can be used as a rotary tool.

The securing element 220 can be configured as a retaining clip and generally serves to hold together the individual components. After the components are secured in the gear cover by additional laterally arranged bolts, the mounting device 210 and thus the securing element 220 can be removed again.

LIST OF REFERENCE SIGNS

10 Drive machine
20 Coupler mechanism
21 Housing
22 Actuating device
24 Actuator
25 Adapter shaft
26 Actuating element
27 First spring element
27a Spring element region
28 Second spring element
29 Third spring element
30 Eccentric element
30a Second opening
32 Stop on eccentric element side
34 Stop on shift element side
37 Shift element stop
38 Eccentric element stop
40 Clutch
42 First gear
43 Gear recess
43a Gear depression
44 First clutch element
45 Engagement groove
52 Second gear
53 Shaft
54 Second clutch element
60a-e Rolling bearing
62 Shift element (shift rocker, shift fork)
62a First opening
63 Engagement element
64 First element arm portion
66 Second element arm portion
70 Connecting element
80 Locking element
90 Parking lock device
92 Parking lock element
93 Parking lock element bearing
94 Parking lock wheel
100 Drive wheel
102 First transmission shaft
103 Splined shaft end portion
104 First transmission gear
106 Second transmission shaft
107 Internal toothing
108 Second transmission gear
110 Drive axle
200 Mounting assembly
210 Mounting device
220 Securing element
222 First securing element end
223 First leg region
224 Second securing element end
225 Second leg region
230 Securing element central region
232 First protective element
234 Second protective element
240 Handle region
D1 (first) rotational direction
D2 (second) rotational direction
ECU Control unit
F_SK Shifting force
F_VK Displacing force
K Motor vehicle
KF Flux of force
KS Coupling position
ES Decoupling position
P1 Parking lock position
P2 Unlocking position
RB Relative movement
SG Spur gear transmission
U Circumferential direction
x Axis of rotation z Longitudinal direction of extent.

The invention claimed is:

1. A mounting assembly for a coupler mechanism of a motor vehicle, comprising:
    a plurality of components which are to be mounted during mounting of the coupler mechanism as the coupler mechanism is being assembled, wherein
        a shifting element corresponds to one of the components which is configured to shift a clutch of the coupler mechanism,
        at least one first spring element corresponds to one of the components which is received displaceably on the shifting element and which is configured for at least indirect spring-force-preloaded support on a housing of the coupler mechanism; and
    a mounting device which is separated from the plurality of components in a finally produced state of the coupler mechanism,
    wherein the mounting device comprises:
        a securing element with a first securing element end and a second securing element end, of which at least the first securing element end is reversibly coupled releasably to the shifting element and, as a result, secures the first spring element against sliding off the shifting element during mounting.

2. The mounting assembly according to claim 1, further comprising:
    a second spring element as one of the components which is coupled at least indirectly to an eccentric element as one of the components which is configured for displacing a parking lock element of a parking lock device of the motor vehicle between a parking lock position and an unlocking position.

3. The mounting assembly according to claim 2, wherein the first securing element end is reversibly inserted releasably into a first opening arranged on the shifting element and the second securing element end into a second opening arranged on the eccentric element.

4. The mounting assembly according to claim 3, wherein the first opening and the second opening are of skewed orientation relative to one another.

5. The mounting assembly according to claim 2, wherein at least for mounting of the components, the second spring element is secured via the second securing element end against sliding off the shifting element.

6. The mounting assembly according to claim 2, wherein the first spring element and the second spring element, in the arrangement thereof on the shifting element, are held secured against respectively sliding off in a longitudinal direction of extent of the shifting element between the first securing element end and the second securing element end.

7. The mounting assembly according to claim 1, wherein the mounting assembly comprises a first gear as one of the components; and
    a securing element central region of the mounting device connecting the first securing element end and the second securing element end encompasses the first gear.

8. The mounting assembly according to claim 7, wherein the securing element central region engages in a gear depression of the first gear.

9. The mounting assembly according to claim 7, wherein the securing element central region has a handle region which is configured for holding the mounting assembly during mounting.

10. The mounting assembly according to claim 7, wherein the mounting device comprises at least one protective element which prevents contact of the securing element with the first gear during mounting and which is connected to the securing element.

* * * * *